United States Patent [19]

Nakanishi et al.

[11] Patent Number: 4,894,856
[45] Date of Patent: Jan. 16, 1990

[54] CORDLESS TELEPHONE SET OPERATED UNDER MULTI-CHANNEL ACCESS

[75] Inventors: Akio Nakanishi, Sagamihara; Ken-ichi Ikegaya; Takao Naitoh, both of Yokohama, all of Japan

[73] Assignee: Fujitsu Limited, Kawasaki, Japan

[21] Appl. No.: 86,503

[22] Filed: Aug. 18, 1987

[30] Foreign Application Priority Data

Aug. 19, 1986 [JP] Japan .................. 61-192152

[51] Int. Cl.⁴ .............................. H01Q 7/04
[52] U.S. Cl. ........................... 379/61; 455/34; 379/58
[58] Field of Search ............... 379/61, 63, 58; 455/32, 455/34, 77

[56] References Cited

U.S. PATENT DOCUMENTS

| | | | |
|---|---|---|---|
| 4,484,355 | 11/1984 | Henke et al. | 455/76 |
| 4,597,104 | 6/1986 | Ohki et al. | 455/32 |
| 4,656,653 | 4/1987 | Oda et al. | 379/61 |
| 4,672,657 | 6/1987 | Dershowitz | 379/63 |
| 4,682,351 | 7/1987 | Makino | 379/61 |
| 4,694,485 | 9/1987 | Iwase | 455/34 |
| 4,744,101 | 5/1988 | Saegusa | 379/61 |
| 4,768,219 | 8/1988 | Yamagawa et al. | 379/61 |
| 4,768,220 | 8/1988 | Yoshihara et al. | 379/61 |

FOREIGN PATENT DOCUMENTS 60-62747  4/1985  Japan .

OTHER PUBLICATIONS

Japan Communications Review, vol. 26, No. 2, Apr. 1984, "Cordless Telephone Using Multi-Channel-Access Technique", R. Kawasaki, pp. 101-105.

Primary Examiner—Robert Lev
Attorney, Agent, or Firm—Staas & Halsey

[57] ABSTRACT

A cordless telephone set is comprised of a base unit and a handset unit connected by an radio frequency (RF) link. The base unit collects channel information indicating that a channel is busy or idle. The channel information is continuously renewed during a stand-by mode, and the last channel information is stored in a channel RAM of the base unit. The same uptodate information is also given to a channel RAM in the handset unit during the same mode. Thus, when the stand-by mode is released, both units can quickly search and kind an idle channel common to the two, with reference to the uptodate channel information stored in the respective channel RAM's.

17 Claims, 9 Drawing Sheets

CORDLESS TELEPHONE SET OPERATED UNDER MULTI-CHANNEL ACCESS

BACKGROUND OF THE INVENTION

1. Field of the Invention

The present invention relates to a cordless telephone system operated on a multi-channel access basis.

2. Description of the Related Art

A cordless telephone system comprises a fixed station and a mobile station connected via a radio frequency (RF) link. A handset unit is provided at the mobile station, and a base unit is provided at the fixed station. The base unit contains a controller able to connect with an external telephone network. These base and handset units are connected through an RF link established by the respective antennas thereof. Thus, the handset unit can receive or originate a call anywhere in a service area of, for example, several hundred meters in diameter, and that call is sent to or received from another subscriber through the external telephone network and the base unit.

If a plurality of similar cordless telephone sets are used within short distance from each other, radio interference is apt to occur. From this viewpoint, a conventional method for establishing an RF link between the base and handset units, i.e., a single channel access, is not practical. Accordingly, a multi-channel access method for these cordless telephones has become widely used. In the multi-channel access system, before the establishment of the RF link, first a search is made for an idle channel among a plurality of previously allotted channels, and then a single idle channel is selected as the common RF link. A speech path is then established between the base and handset units via the thus selected common RF link. The present invention relates to a cordless telephone set operated under such a multi-channel access system.

In the prior art, several methods for utilizing a multi-channel access have been proposed. According to one method, both the base unit and the handset unit contain respective read-only memories (ROM's), and each of the ROM's stores the same data, which specifies the sequential order of searching the channels. Thus, the base unit and the handset unit both search for the idle channel, through access to their own ROM's, to find a common channel.

According to another prior art method, one of the channels is allotted, in advance, as a control channel, and thus the base unit can inform the handset unit of the number of the idle channel to be used for communication therebetween, by using the control channel.

According to a further prior art method, a cordless telephone set is provided with a first memory, in either the base unit or the handset unit, and a second memory is provided in the other unit. The first memory stores previously determined data specifying the group of channels to be used among a plurality of previously allotted channels. The data in the first memory is copied and transferred to the second memory during a stand-by mode, i.e., both the base unit and the handset unit are in the idle state, and thus both units can find an idle channel to be used by referring to the first and second memories. This prior art is disclosed in, for example, Japanese Unexamined Patent Publication (Kokai) No. 60-62747 (laid-open on Apr. 10, 1985).

The above mentioned methods all have disadvantages. According to the first method, the base unit and the handset unit scan the idle channels independently and, every time a busy channel is found, perform an investigation of whether the received identification (ID) code coincides with the previously determined code. In short, the base unit and the handset unit realize their respective channel searches for catching a common channel independently of each other, and as a result, a very long time is needed to establish an RF link between the base and handset units. For example, in the worst case, it has been known to take about 10 seconds to establish the RF link if a large number of channels are used for the multi-channel access in the cordless telephone system.

The cordless telephone system of the second method is not advantageous from an economical view point, since one of the channels, i.e., the control channel, can not be used for normal communication purposes. Further, in the second method it often takes a very long time to establish an RF link between the base and handset units when a conflict arises, regarding use of the common channel, between two or more base and handset units.

According to the third method, the cordless telephone set can use only the channels previously specified by the aforesaid first memory. This means that it will take a very long time to find an open channel from among the limited number of channels available, especially under heavy communication traffic conditions when a plurality of cordless telephones sets are used in one system.

As can be understood from the above, each of the prior art cordless telephone systems using a multi-channel access has a common disadvantage of a long wait before completing the RF link between the base and handset units. This causes a related disadvantage of frequent call conflicts, and such call conflicts cause inconvenience to the user of the telephone. For example, a bell or buzzer, etc., in a base unit is driven when the base unit receives an incoming call from the external telephone network. The operator then lifts the handset unit and pushes the hook button to receive the incoming call at the handset unit. In this case, if the hook button is pushed while the bell, etc., at the handset unit is still ringing, the incoming call is received by the user in the usual fashion. If, however, the hook button is pushed before the bell, etc., rings at the handset unit, the incoming call is not received and a call conflict occurs. This is because, if the hook button is pushed before the bell, etc., rings, then the system treats this as a call origination demand by the user, and thus both an internal origination call state and an external incoming call state occur simultaneously. If the related condition continues for a predetermined time, such as 3 seconds, the handset unit detects that a call conflict has occurred, and thus the call origination demand by the user is automatically cancelled and the incoming call is retrieved. An impatient user will be irritated by this procedure for a cancellation of such a call conflict.

SUMMARY OF THE INVENTION

Accordingly, an object of the present invention is to provide a cordless telephone set which can quickly search and find an idle channel for an establishment of an RF link between the base and handset units thereof. This quick establishment of an RF link will minimize the chances of the occurrence of a call conflict. Also, this quick establishment of an RF link will, of course, shorten the time needed for setting up a communication link.

To attain the above object, the present invention features channel random access memories (RAM) mounted in the base unit and the handset unit wherein, during a stand-by mode, first the base unit searches for idle channels to obtain idle channel information, and the thus-searched idle channel information is stored in the RAM. The same information is also stored in the other RAM in the handset unit. Thus, the idle channel information in both units is continuously renewed until the stand-by mode is released. When an active mode begins, the base unit and handset unit search for and find a common idle channel by using the last renewed idle channel information stored in the respective RAM's.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 1A:
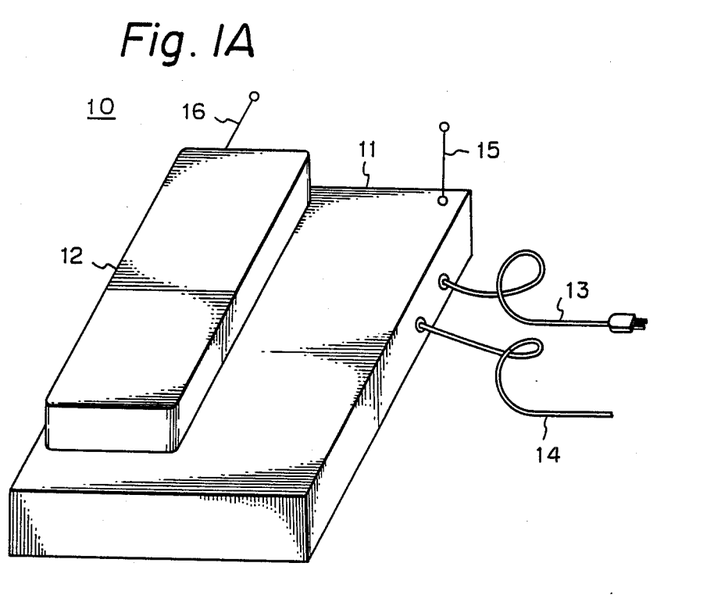
FIG. 1A is a perspective external view of a conventional cordless telephone set.

FIG. 1A is a perspective external view of a conventional cordless telephone set. The cordless telephone set 10 is comprised of a base unit 11 and a handset unit 12. The base unit 11 is provided with a commercial power AC line 13 and a telephone line 14, which is connected with a telephone switching network. The cordless telephone set 10 is shown in a stand-by mode, in which battery charging to the handset unit 12 is carried out.

During the stand-by mode, when an incoming call is received by the base unit 11, a bell, etc., in the unit 11 is driven. The user then lifts the handset unit 12 and uses it in the same way as a usual handset. Conversely, when wishing to originate a call, the user lifts the handset unit 12 and carries out a dialing operation by using the push buttons arranged at the back of the handset unit 12, as shown in FIG. 1B.

Figure 1B:
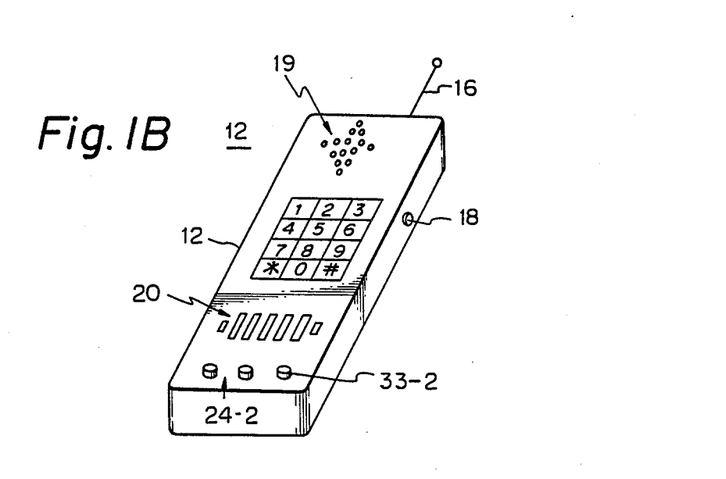
FIG. 1B is a perspective front view of a conventional handset unit of FIG. 1A.

FIG. 1B is a perspective front view of a conventional handset unit of FIG. 1A. An incoming call is received by operation of a hook button 18, and a call is originated by the operation of the same hook button 18. Namely, a usual "off-hook" or "on-hook" operation is performed by pressing the hook button 18. A receiver 19 and a microphone 20 are located at opposite ends, respectively, of the handset unit 12. Referring to FIGS. 1A and 1B, when the base and handset units 11 and 12 are separated, both units 11 and 12 are connected with each other via an RF link through antennas 15 and 16 extendably fixed to the base and handset units 11 and 12, respectively.

Some cordless telephone systems employ a plurality of identical cordless telephone sets, and therefore, the service areas for each cordless telephone set necessarily partially overlap. To cope with this overlap in service areas, a multi-channel access system is used in which, first, a search is made for an idle channel among a plurality of previously allotted channels by both of the units 11 and 12, and then a common idle channel is found to establish an RF link therebetween. In this case, an identification (ID) code is utilized to ensure that the related pair of the units 11 and 12 commonly find exactly the same channel. The ID code is transmitted from one unit to the other by a carrier wave. That is, the carrier wave is modulated by the ID code. To establish the RF link in the multi-channel access system, a variety of methods therefor have been proposed as mentioned hereinbefore.

Figure 2:
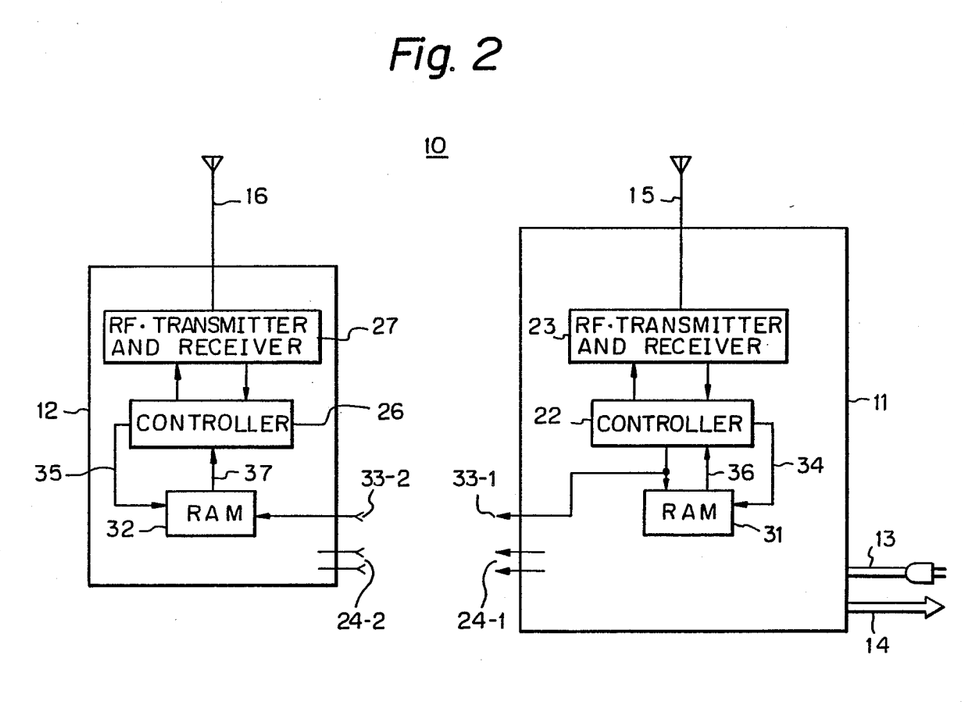
FIG. 2 is a schematic block diagram of the basic arrangement of the cordless telephone set according to the present invention.

The cordless telephone set according to the present invention can quickly establish an RF link. FIG. 2 is a schematic block diagram of a basic arrangement of the cordless telephone set according to the present invention. In FIG. 2, members identical to those of previous figures are represented by the same reference numerals or characters (as for all later figures). In FIG. 2, the present invention is featured by channel random access memories (RAM's) 31 and 32 mounted in the base and handset units 11 and 12, respectively. In the base unit 11, an identification (ID) code memory (not shown), a controller 22, an RF·transmitter receiver (RF·T/R) 23 etc., are provided, and in the handset unit 12, an identification (ID) code memory (not shown), a controller 26, an RF·T/R 27 etc., are mounted. Battery charging contacts 24-1 and 24-2 are used for charging a battery in the unit 12 from the base unit 11. One of the battery charging contacts, i.e., 24-2 is also illustrated in FIG. 1B and is automatically in contact with the other contacts 24-1 (not shown in FIGS. 1A and 1B) during the stand-by mode in which the handset unit 12 is located on the base unit 11 as shown in FIG. 1A. The AC power supplied from a line 13 is converted in the base unit 11 into DC power and then supplied to the handset unit 12.

In FIG. 2, the content of the channel RAM 31 can be rewritten continuously. The content of the channel RAM 32 is also rewritten continuously. The information written in the RAM 31 is also written in the RAM 32 through information writing contacts 33-1 and 33-2 during the stand-by mode. One of the contacts, i.e., 33-2, is illustrated in FIG. 1B as an example thereof.

The channel RAM's 31 and 32 are accessed by the respective controllers 22 and 26 via respective address lines 34 and 35. The information read from the respective RAM's 31 and 32 is input to the controllers 22 and 26, via respective read lines 36 and 37.

The operation of the cordless telephone set 10 according to the present invention is as follows. Each of the controllers 22 and 26 controls its own channel RAM 31 and 32, respectively, to search and find a common idle channel through which the RF link is established therebetween. During the stand-by mode, the controller 22 at the base unit 11 side searches a plurality of channels sequentially one by one, and at the same time, the controller 22 detects whether or not a carrier wave is transmitted, from the handset unit 12, to the base unit 11. During the above-mentioned search, the controller 22 discriminates which channels are idle and which are busy. The discriminated idle channels are written, as idle channel information, in the channel RAM 31. The same information is also written in the channel RAM 32 at the handset unit 12. This write operation is carried continuously during the stand-by mode, and therefore, the RAM 31 always has up-to-date idle channel information stored therein. This also applies to the RAM 32. Namely, the same up-to-date information is recorded in each RAM 31 and 32.

When an incoming call or an origination call is generated, the handset unit 12 is separated from the base unit 11, and the cordless telephone set 10 is switched from a stand-by mode to an RF link establishing mode. In the latter mode, first, both the base unit 11 and the handset unit 12 begin to search and find an idle channel. In this case, each unit searches and finds the idle channel by referring to the up-to-date idle channel information stored in the respective RAM's 31 and 32, and accordingly, an idle channel common to both units 11 and 12 can be found in very short time. The idle channel can be found more rapidly by setting a predetermined priority channel common to both units 11 and 12. Thus, each unit starts the search for an idle channel from the same priority channel and continues the search sequentially in same order following the priority channel until a common idle channel is found, for example, in the order 25→26→ . . . 39→40→1→2→ . . ., where forty channels are provided and the priority channel is predetermined as No. 25.

Figure 3:
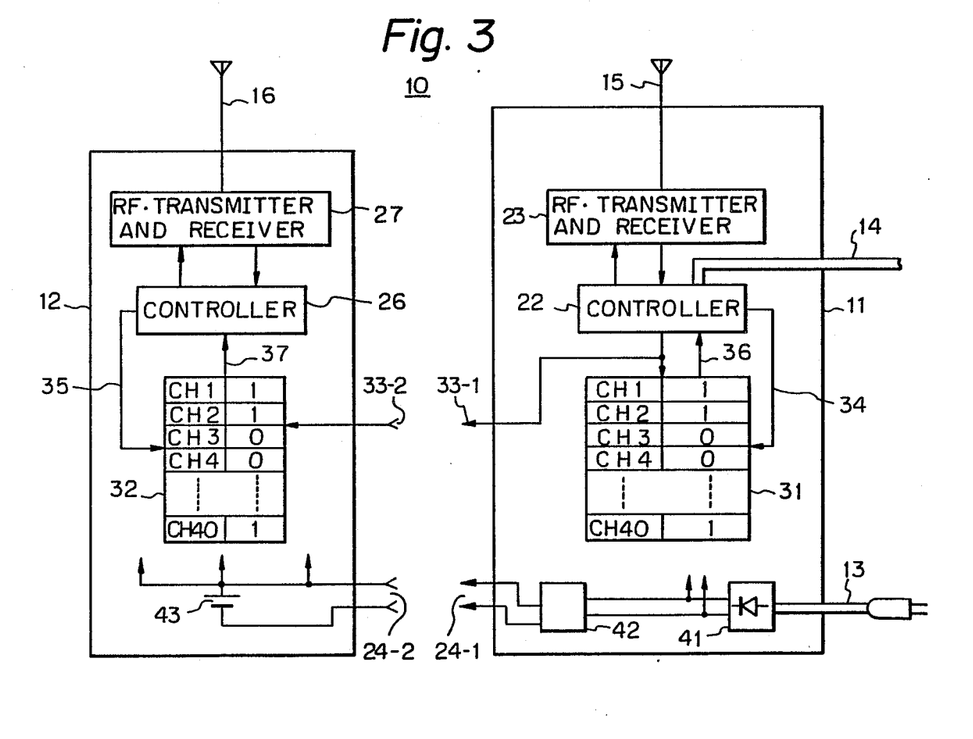
FIG. 3 is a detailed schematic block diagram of the cordless telephone set of FIG. 2.

FIG. 3 is a detailed schematic block diagram of the cordless telephone set of FIG. 2. In FIG. 3, reference numeral 41 represents a rectifier, 42 a charger, and 43 a battery. The battery 43 in the handset unit 12 and the charger 42 in the base unit 11 are connected through the battery charging contacts 24 - 1 and 24 - 2. Such a charging circuitry, driven in the stand-by mode, is widely used in the cordless telephone systems. According to the present invention, the stand-by mode driving is uniquely utilized for a rapid establishment of the RF link. That is, when charging energy is being supplied to the handset unit 12 in the stand-by mode, up-to-date idle channel information is also supplied to the handset unit 12, simultaneously. To accomplish this, not only the conventional battery charging contacts 24-1, 24-2, but also the information writing contacts 33-1 and 33-2 are employed. The latter contacts 33-1 and 33-2 are automatically connected to each other in the stand-by mode, similarly to the former contacts 24-1 and 24-2, when the handset unit 12 is located on the base unit 11, as illustration in FIG. 1A.

When the contents of the channel RAM's 31 and 32 are logic "1", this indicates that the channel is busy (in use), and when logic "0", that the channel is idle, as illustrated in FIG. 3. When an incoming call or an origination call is generated, both the base unit 11 and the handset unit 12 start to search for an idle channel, while referring to the respective channel RAM's 31 and 32. During the search, the channels indicating logic "1" are ignored and other channels having logic "0" are accessed to select a channel. This shortens the channel search time. For a shorter channel search time, as mentioned above, a priority channel, for example, CH 25, common to the units 11 and 12 is predetermined.

Figure 4:
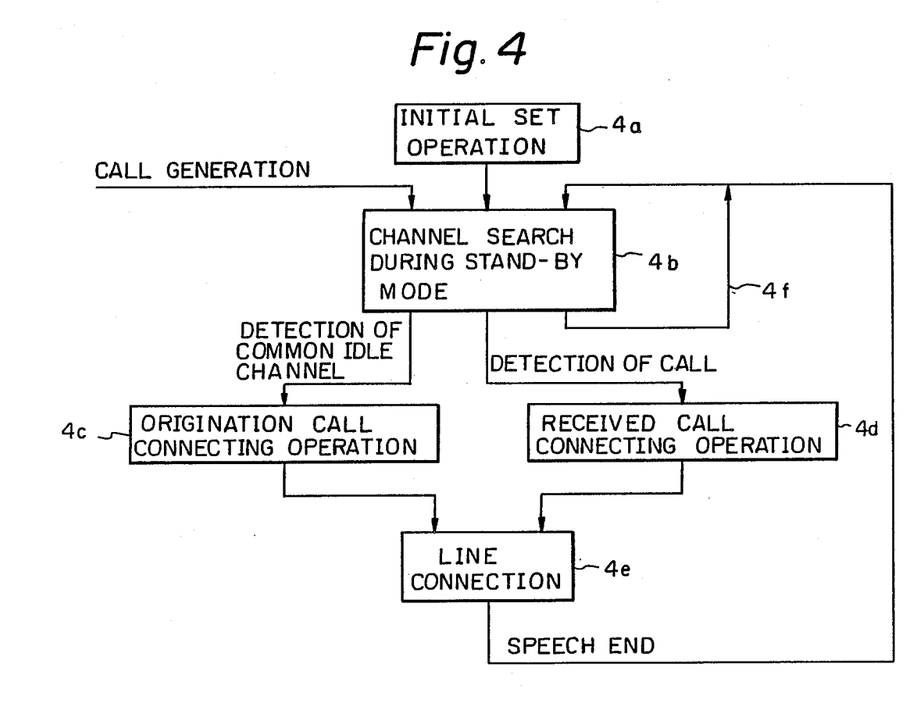
FIG. 4 is a general flow chart for explaining the operation of the cordless telephone set of FIG. 2.

FIG. 4 is a general flow chart for explaining the operation of the cordless telephone set of the present invention. The flow chart steps apply to both the base unit 11 and the handset unit 12. At step "4a", a channel search is carried out by the controllers 22 and 26 in accordance with an initial set operation. During the channel search, idle channels and busy channels are discriminated, and the resultant discrimination is input to the channel RAM's 31 and 32 (FIG. 3). That is, logic "0" and "1" are written thereto. The write operation is continued until the end of the stand-by mode. Therefore, when a call is generated (CALL GENERATION), the last idle channel information received remains in each channel RAM 31 and 32. Step 4b in FIG. 4 represents the above-mentioned channel search during the stand-by mode.

When a call is generated, both the base unit 11 and the handset unit 12 search and find a common idle channel. Thereafter, at step "4c", a origination call connecting operation, for example, is carried out. This is executed by an origination call side controller (22 or 26).

On the other hand, at step "4b", if an incoming carrier wave is detected, a call detection state is realized and, thereafter, at step "4d", a received call connecting operation is carried out.

Step "4c" and step "4d" lead to step "4e", where a desired line connection is set up to open communication. When the communication ends (speech end), the stand-by mode (step "4b") is reinstated. In step "4b", if an idle channel common to both units 11 and 12 is not found, the channel selection is continued via a path shown by "4f" in FIG. 4. At this time, the priority channel, mentioned previously with regard to the RAM's 31 and 32 of FIG. 3, is switched to net lower order channel relative to the priority channel. If a common idle channel still cannot be found, a lower order channel is selected. Such a channel shift is performed sequentially, one by one, until a common idle channel is found. In this channel shift, only channels having logic "0" in the RAM's, i.e., idle channels, are searched.

Figure 5:
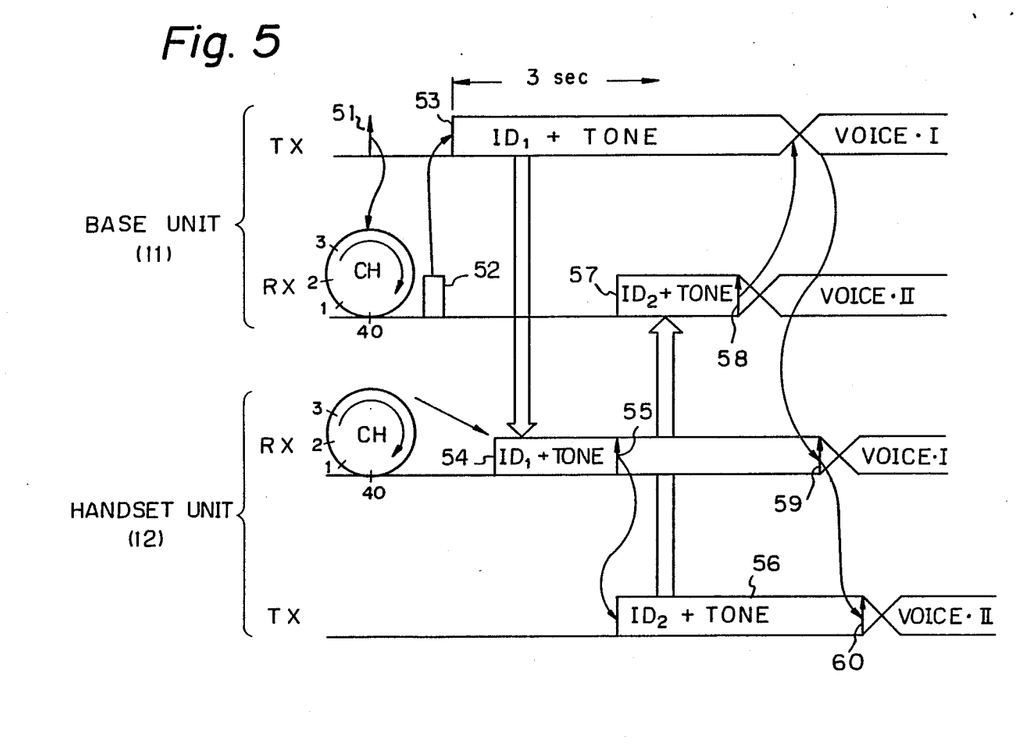
FIG. 5 is a sequence diagram for explaining the operation realized in the cordless telephone set of FIG. 2.

FIG. 5 is a sequence diagram used for explaining the operation of the cordless telephone set. In FIG. 5, the upper half thereof shows the operations by a transmitter part (TX) and a receiver part (RX) of the base unit 11, and lower half shows the operation by a transmitter part (TX) and a receiver part (RX) of the handset unit 12. FIG. 5 depicts the operations whereby an RF link establishing mode is first established, followed by a speech mode. The speech mode is represented by the characters "VOICE". The two VOICE-I lines establish an RF link between the base unit 11 and the handset unit 12, and at the same time, the two VOICE-II lines establish another RF link from the handset unit 12 to the base unit 11, thus forming a two-wave duplex. FIG. 5 will be further clarified with reference to FIGS. 6 and 7.

Figure 6:
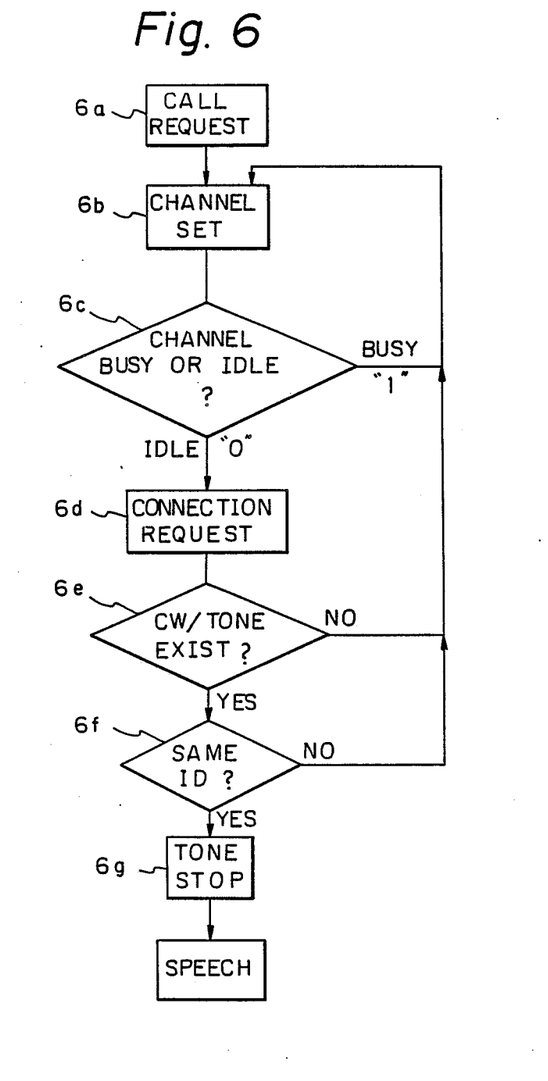
FIG. 6 is a flow chart for explaining the operation of the base unit in the RF link establishing mode.
Figure 7:
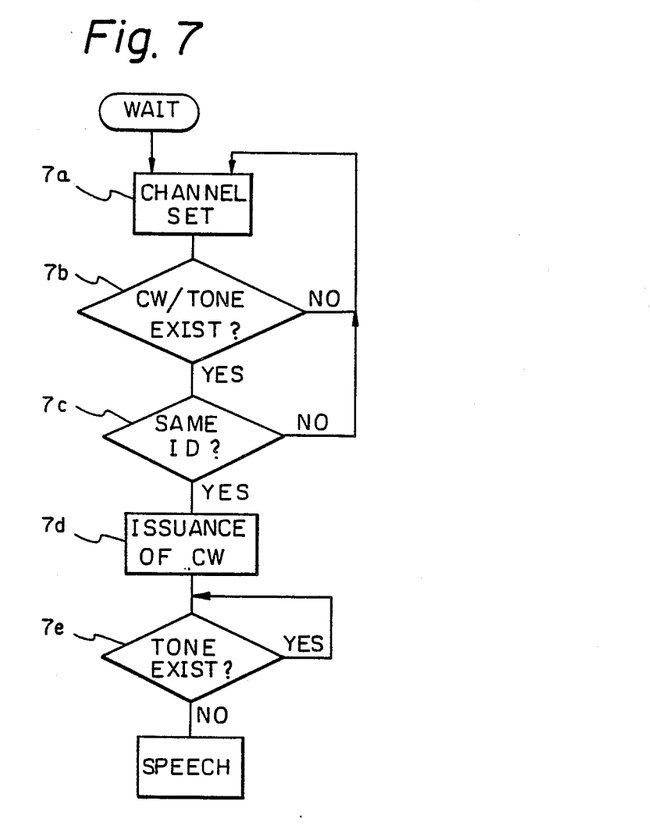
FIG. 7 is a flow chart for explaining the operation of the handset unit in the RF link establishing mode.

FIG. 6 is a flow chart explaining the operation of the base unit 11 when the RF link is established. FIG. 7 is a flow chart explaining the operation of the handset unit 12 when the RF link is established. Both flow charts correspond to the steps "4b"+"4f" of FIG. 4. A call is requested at step "6a" (FIG. 6), as schematically illustrated by an arrow 51 in FIG. 5. Then a channel is set at step "6b" (FIG. 6). The channel set is performed in the receiver (RX) of the base unit 11, and is sequentially realized as illustrated by the circles in FIG. 5 numbered 1, 2, 3 . . . 40. At each channel, it is detected whether the channel is busy or idle by a noise squelch (refer to step "6c"). If the thus set channel is busy (in use), the next channel is selected at step "6b". Conversely, if an idle channel 52 is found at step "6c", the transmitter of the base unit 11 transmits a carrier wave corresponding to the idle channel. The carrier wave is shown as 53 in FIG. 5, and continues for a predetermined time, for example, 3 secs. This corresponds to step "6d" in FIG. 6, in which the transmitter produces a connection request signal, which signal comprises the carrier wave modulated by an identification (ID) code and a channel No., i.e., CH. The ID code is represented by $ID_1$ in FIG. 5, and is provided with a tone signal "TONE". The tone signal "TONE" is used to discriminate whether the channel is used for a control of the RF link, or for the speech path.

The signal 53 from the transmitter of the base unit is received at the receiver (RX) of the handset unit 12 (refer to 54 in FIG. 5). To accomplish this, the handset unit 12 executes a channel set operation at step "7a" (FIG. 7), as in step "6b". The channel set is sequentially achieved as illustrated by the circles in FIG. 5 numbered 1, 2, 3 ... 40. In step "7b", the receiver determines whether the carrier wave (CW) and/or the tone signal (TONE) exist. If neither CW nor TONE exists ("NO"), the next channel is selected at step "7a". The loop "7a"→"7b"→"7a"→"7b"→ . . . is executed very quickly, for example about 30 ms per loop. If both CW and TONE exist at step "7b" ("YES"), the related signal is received as the signal 54 of FIG. 5. In this case, the carrier wave CW now carries the control information such as $ID_1$ and CH, and not speech information. Accordingly, the handset unit 12 checks whether or not the received $ID_1$ coincides with the ID previously allotted thereto. If the ID codes are not the same, ("NO") at step "7c", the next channel is selected at step "7a". Conversely, if the ID codes are the same (step "7c"→"YES"), an ID coincidence signal, schematically illustrated by an arrow 55, is issued. The signal 55 triggers step "7d" (FIG. 7), in which the transmitter (TX) of the handset unit 12 produces a carrier wave (CW) which is modulated by an identification (ID) code $ID_2$, and at the same time, is provided with a tone signal "TONE" indicating that the CW now carries control information and not speech information. The related signal is referenced by 56 (FIG. 5) and received as a signal 57, by the receiver (RX) of the base unit 11.

Returning to step "6e" of FIG. 6, the receiver (RX) of the base unit 11 detects whether or not CW/TONE exist. If neither CW nor TONE exist (step "6e"→'NO"), the next channel is selected. Conversely, if CW and TONE exist (step "6e"→"YES"), then step "6f" commences. If the received ID code and previously allotted ID code, are the same, (step "6f"→"YES"), an ID coincidence signal, schematically illustrated by an arrow 58, is issued, and the channel reserved for the transmitter TX is changed from a control path to a speech path, by not supplying the tone signal "TONE" (refer to step "6g" of FIG. 6) together with the $ID_1$. The non-transmission of the tone signal "TONE" together with the $ID_1$ is detected at step "7e" (FIG. 7) by the receiver RX of the handset unit 11, and thus the handset unit 12 produces an acknowledge signal, schematically illustrated by an arrow 59. On one hand, the signal 59 changes the channel to a speech mode (VOICE-I), and on the other hand, triggers another acknowledge signal 60 which also changes the channel to a speech mode (VOICE-II). The speech mode is executed at a modulation frequency range of 300 Hz to 3400 Hz. The aforesaid tone signal "TONE" has a frequency higher than 3400 Hz and acts as a usual pilot signal.

Figure 8A:
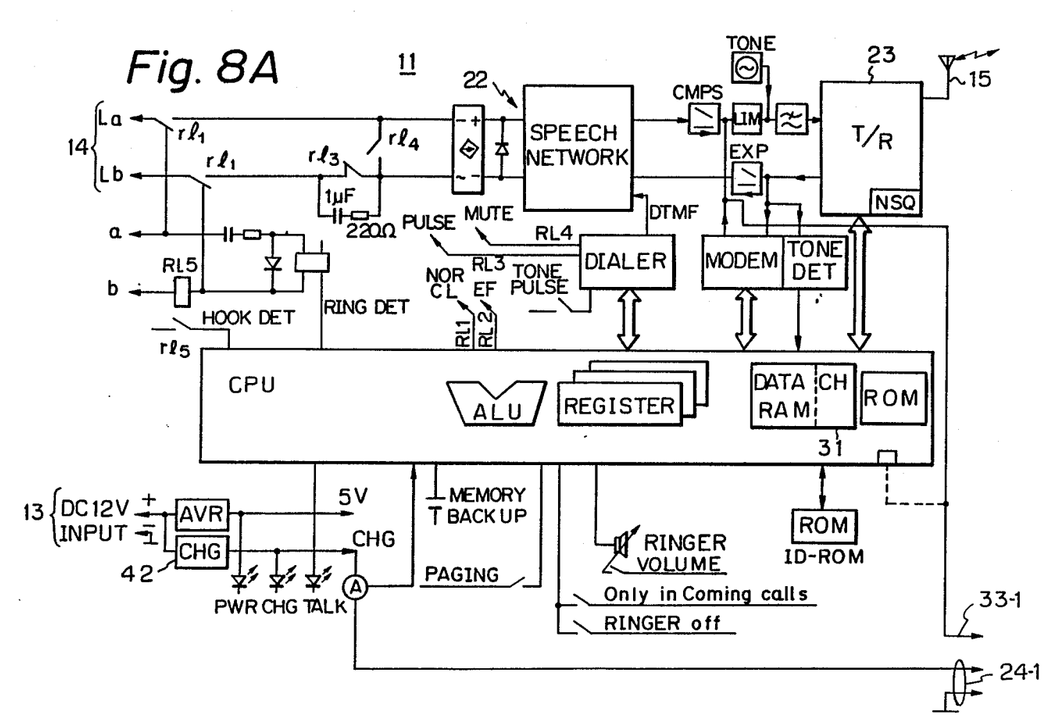
FIG. 8A is a block diagram of the base unit side of the cordless telephone set according to the present invention.
Figure 8B:
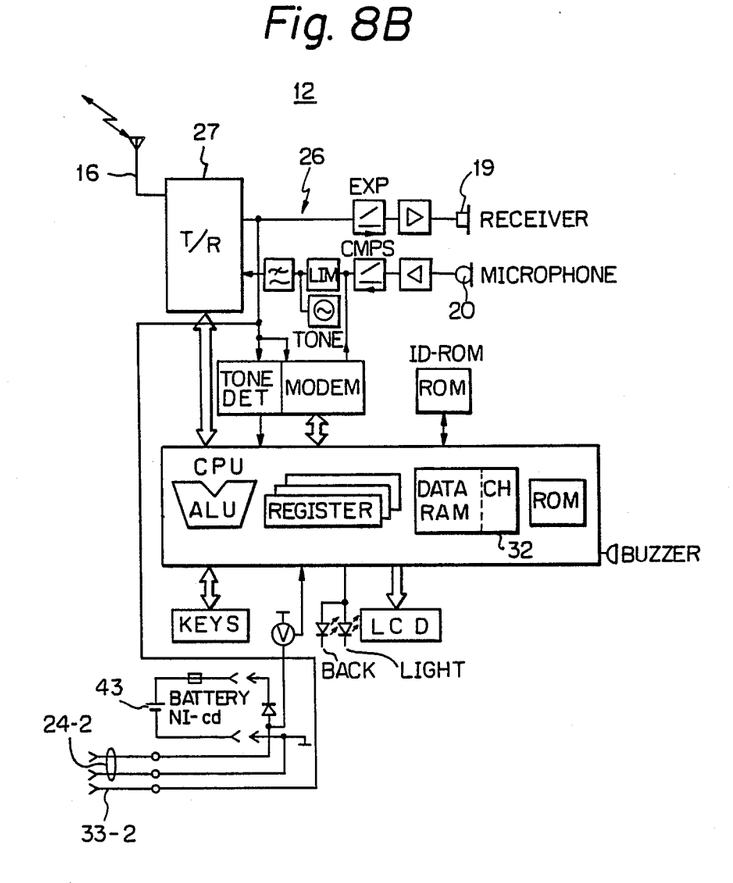
FIG. 8B is a block diagram of the handset unit side of the cordless telephone set according to the present invention.

FIG. 8A is a block diagram of the base unit side of the cordless telephone set according to the present invention, and FIG. 8B is a block diagram of the handset unit side of the cordless telephone set according to the present invention. In FIG. 8A, the members identical to those of FIG. 3 are represented by the same reference numerals. Namely, the base unit 11 of FIG. 8A is comprised of the antenna 15, the RF-transmitter and receiver (T/R) 23, the channel RAM 31, the information writing contact 33-1, and the charger 42, etc. The remaining portion in FIG. 8A is the controller 22 of FIG. 3 having a central processing unit CPU. The channel RAM 31 is formed as a part of a usual RAM (data RAM) for the CPU, and the CPU is provided with an identification (ID) code ROM (ID-ROM) storing the aforesaid ID's.

The channel set of step "6b" (FIG. 6) is realized in the RF-transmitter/receiver 23 in cooperation with the CPU, and particularly the channel RAM 31. The detection of whether the channel is busy or idle is also realized in the RF-transmitter/ receiver 23 (refer to step "6c" of FIG. 6).

To achieve the above channel set, the CPU prepares the channel RAM for recording the up-to-date status of each channel during the stand-by mode, in which the contacts 24-1, 24-2, 33-1 and 33-2 are coupled. First, the CPU realizes channel set, i.e., channel selection one by one. Then, when the channel No. 1 is determined, the channel RAM 31 is readied to receive the channel information ("busy→"1" or "idle→"0") at the address corresponding to channel No. 1. At the same time, the noise squelch (NSQ) in the RF-transmitter/receiver 23 detects whether or not an electrical field at the frequency corresponding to channel No. 1 exists. If the frequency is detected, the channel information is stored in the channel RAM with the data "1" (in use). If the frequency is not detected, the channel information is stored in the channel RAM with the data "0" (idle). A similar operation is repeated for each channel to create the channel map as shown in FIG. 3.

The content of the channel RAM 31 is periodically transferred to the channel RAM 32 of the handset unit 12, via the information writing contact 33-1. The transfer is performed in the form of a serial data transmission, and this serial data transmission is preferably carried out from the CPU of the base unit 11 to a CPU of the handset unit 12 through respective modulator-demodulators (MODEM's). Usually, the MODEM converts the digital data from the CPU to an analog signal suitable for RF transmission by using, for example, mark (1800 Hz)-space(1200 Hz) keying (MSK). The MSK signal is transferred to the MODEM of the handset unit 72 and converted to the corresponding digital data, and then stored in the channel RAM 32 of the handset unit.

Figure 9:
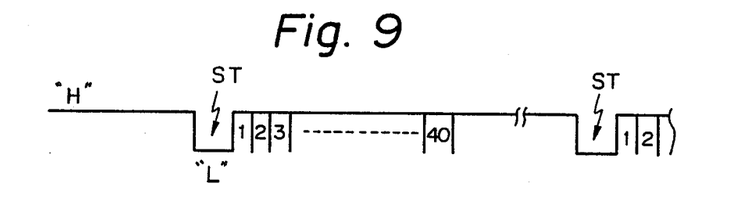
FIG. 9 is an example of a data format for the serial data transmission of channel information.

Alternatively the serial data transmission of the channel information can be performed in the form of digital data, as is. In this case, it is not necessary to pass the data through the MODEM's, and the data can be directly transferred from the CPU, at an input/output (I/O) port thereof, of the base unit 11 to the CPU, at the I/O port thereof, of the handset unit 12, via the contacts 33-1 and 33-2. Accordingly, the above mentioned serial data transmission of the channel information can be executed under a known start-stop transmission method, as illustrated in FIG. 9. FIG. 9 is an example of a data format for the serial data transmission of the channel information. In FIG. 9, the information from forty channels is periodically transmitted synchronously with a start bit ST having a logic "L" (low). Each serial data transmission can be executed in a time as short as, for example, 30 ms. However, the renewal of the channel RAM 31 takes considerably longer, for example, about 1200 (=30 ms×40 ch) ms.

The serial data transmission, under the stand-by mode, stops every time a call request (step "6a" of FIG. 6) is generated, and then the RF link establishing mode is commenced. The call request can be automatically determined by the CPU's every time the handset unit 12 is separated from the base unit 11 by the user. That is, when the handset unit 12 is lifted from the base unit 11, the current charge is immediately stops. The stoppage of the current charge is detected by a detector "A" in FIG. 8A and this information sent to the CPU. At the handset unit side of FIG. 8B, when the handset 12 is separated from the base unit 11, the voltage charge immediately drops to zero, and this voltage drop is detected by a detector "V" in FIG. 8B and sent to the CPU.

In FIG. 8B, the handset unit 12 is comprised of the antenna 16, the RF-transmitter and receiver (T/R) 27, the channel RAM 32, the information writing current contact 33-2, the battery 43, etc. The remaining portion in FIG. 8B is the controller 26 having the central processing unit CPU as mentioned above. The CPU includes the aforesaid channel RAM.

In FIG. 8B, the characters EXP represent an expander, CMPS a compressor, TONE the aforesaid tone signal source, TONE DET the aforesaid tone signal detector, KEYS the aforesaid the keys, LCD a liquid crystal display for indicating various information, such as a dial number, and an ID-ROM having the aforesaid identification code memory. The same is true for FIG. 8A.

As explained above in detail, the cordless telephone set according to the present invention realizes a very quick line connection and accordingly, minimizes a waiting time for the user.

We claim:

1. A cordless telephone set operated under multichannel access, comprising a base unit and a handset unit between which a radio frequency (RF) link is formed through a channel selected from previously allotted channels, wherein
the base unit and the handset unit are each provided with a channel random access memory (RAM) for storing up-to-date channel information indicating whether each of the channels is busy or idle, which channel information is searched for by said base unit and is continuously renewed and the same channel information is written to both channel RAM's during a stand-by mode, the RAM's being coupled to the base unit during the standby mode, and utilized for a quick establishment of the RF link.

2. A cordless telephone set according to claim 1, wherein the up-to-date channel information is periodically supplied from the base unit to the handset unit via a first write contact at the base unit and a second write contact at the handset unit, these first and second write contacts being automatically connected with each other during the stand-by mode when the handset unit is placed on the base unit to allow a battery charge to the handset unit.

3. A cordless telephone set according to claim 2, wherein the up-to-date channel information is supplied from the base unit to the handset unit in the form of a serial data transmission.

4. A cordless telephone set according to claim 3, wherein the serial data transmission is performed by a start-stop transmission method.

5. A cordless telephone set according to claim 1, wherein the base unit comprises a first radio frequency transmitter and receiver and a first controller having a first central processing unit, and the handset unit comprises a second radio frequency transmitter and receiver and a second controller having a second CPU, the first and second CPU's containing said channel RAM's as a first channel RAM and a second channel RAM, respectively.

6. A cordless telephone set according to claim 5, wherein the up-to-date channel information is collected by the first radio frequency transmitter and receiver in cooperation with an electric field detecting means at frequencies corresponding to each channel, the detecting means providing a logic "1" to indicate the channel is busy and a logic "0" to indicate the channel is idle, and the thus detected logic is stored, at respective addresses in terms of the channel numbers, in the first channel RAM.

7. A cordless telephone set according to claim 6, wherein the electric field detecting means comprises a noise squelch.

8. A cordless telephone set according to claim 6, wherein the up-to-date channel information is supplied, during the stand-by mode, to the second channel RAM in the second CPU in the form of digital data output directly from the first CPU.

9. A cordless telephone set according to claim 6, wherein the up-to-date channel information is supplied from the first channel RAM in the first CPU via a first modulator-demodulator (MODEM) to a second MODEM in the form of an analog signal and input to the second channel RAM in the second CPU.

10. A cordless telephone set according to claim 2, wherein the continuous search for up-to-date channel information is stopped when the handset unit is separated from the base unit, and accordingly, the stand-by mode is released to create an RF link establishing mode.

11. A cordless telephone set according to claim 10, wherein the base unit and the handset unit start a search for and finding of a channel common to the two units, soon after the stand-by mode, with reference to the last up-to-date channel information stored in the first and second channel RAM's, respectively, wherein only the channels having logic "0", which indicates an idle channel, are selectively accessed.

12. A cordless telephone set operable over a plurality of channel, comprising:
a handset unit including first controller means for controlling operations of said handset unit and a first RAM connected to said first controller means for storing channel status data;
a base unit including second controller means for controlling operation of said base unit and determining a state of each of said channel and a second RAM for storing the channel status data,
wherein during a standby mode, said second controller means determines the state of said channels, writes the states of all of said channels into the first and second RAM's as the channel status data, and continuously determines the state of each of said channels and continuously updates the channel status data in the first and second RAM's, the channel status data being used to link said base unit and said handset unit when the standby mode is ended.

13. A cordless telephone set according to claim 12, where said handset unit includes a first write contact connected to the first RAM and said base unit includes a second write contact connected to said second controller means, said telephone set being in the standby mode when the first and second write contacts are connected and the continuously determined channel data is provided to the first RAM from said second controller means via the first and second write contacts during the standby mode.

14. A cordless telephone set according to claim 12, wherein said handset unit further comprises first radio frequency transmitter and receiver means and said base unit further comprises second radio frequency transmitter and receiver means, said first and second radio frequency transmitter and receiver means for establishing a radio frequency link as required.

15. A cordless telephone set according to claim 14, wherein said first and second RAM's each includes a memory address corresponding to each of the channels and when said second controller means is determining the states of each of the channels, the second controller means stores a logic "1" in a corresponding channel address in both RAM's when the state of the channel being determined is busy, and a logic "0" in the corresponding address when the state of the channel being determined is idle.

16. A cordless telephone set according to claim 1, when the standby mode is ended and a radio frequency link establishing mode is entered, the first and second radio frequency transmitter and receiver means sequentially search the channel status data stored in the first and second RAM's, respectively, starting at a predetermined common channel address to find a first channel for which the logic "0" is stored, the first and second radio frequency transmitter and receiver means then attempting to establish a radio frequency link over this first channel.

17. A cordless telephone set according to claim 15, wherein if a radio frequency link cannot be established over the first channel, the first and second transmitter and receiver means starts sequentially searching the first and second RAM's, respectively, starting at an address immediately following an address corresponding to the first channel until a second channel is located for which a logic "0" is stored is found.

* * * * *

UNITED STATES PATENT AND TRADEMARK OFFICE
CERTIFICATE OF CORRECTION

PATENT NO.  : 4,894,856
DATED       : JANUARY 16, 1990
INVENTOR(S) : AKIO NAKANISHI ET AL.

It is certified that error appears in the above-identified patent and that said Letters Patent is hereby corrected as shown below:

FRONT PAGE [57] ABSTRACT, line 10, "kind" should be --find--.

Col. 5, line 32, "in same" should be --in the same--.

Col. 6, line 36, "net" should be --next--.

Col. 8, line 56, "72" should be --12--.

Col. 9, line 17, delete "is".

Col. 10, line 13, after "unit," insert --(CPU)--;
         line 50, delete "and finding of".

Col. 11, line 26, "channels" should be --channels,--.

Col. 12, line 7, "1," should be --15,--.

Signed and Sealed this

Twenty-ninth Day of January, 1991

Attest:

HARRY F. MANBECK, JR.

*Attesting Officer*                *Commissioner of Patents and Trademarks*